United States Patent [19]
Woelich

[11] 3,765,097
[45] Oct. 16, 1973

[54] VARIABLE RING GAUGE
[76] Inventor: Marvin E. Woelich, 916 S. Taylor, Glendive, Mont. 59330
[22] Filed: Oct. 1, 1971
[21] Appl. No.: 185,568

[52] U.S. Cl. .............................................. 33/178 R
[51] Int. Cl. ......................... G01b 3/34, G01b 5/08
[58] Field of Search ..................... 33/147 H, 147 M, 33/178 R, 199 R

[56] References Cited
UNITED STATES PATENTS
603,957   5/1898   Johnson ............................ 33/178 R
FOREIGN PATENTS OR APPLICATIONS
328,792   8/1935   Italy .................................. 33/178 R
319,041   8/1934   Italy .................................. 33/178 R Primary Examiner—Louis R. Prince
Assistant Examiner—Charles E. Phillips
Attorney—Berman, Davidson & Berman

[57] ABSTRACT

A variable ring gauge having a base ring carrying a plurality of slots extending radially thereacross to a central bore. Engaging elements are slidably mounted in the slots for engaging a shaft to be measured extending through the bore. Each of the engaging elements have arcuate thread segments extending thereacross. An adjusting ring is secured to the base ring by means of a lock ring and the adjusting ring is provided with arcuate thread segments on its inner face which cooperate with thread segments on the engaging elements to move the engaging elements inwardly and outwardly in their respective slots equally. The adjusting ring is calibrated on its outer surface and the base ring has an indicator hand cooperating therewith so that as the adjusting ring is adjusted, the diameter of a shaft extending through the bore of the base ring can be read directly.

2 Claims, 7 Drawing Figures

INVENTOR.
MARVIN E. WOELICH,
BY
Berman, Davidson & Berman,
ATTORNEYS.

VARIABLE RING GAUGE

BACKGROUND OF THE INVENTION

FIELD OF THE INVENTION

The present invention relates to a gauge for gauging the diameter of a cylindrical body.

SUMMARY OF THE INVENTION

The gauge includes a base ring having three slots extending radially thereacross in circumferentially equispaced relation with each slot having a radially slidable engaging element mounted therein. Each of the engaging elements have arcuate thread sectors formed on the outer face thereof to be engaged by arcuate thread sectors on the inner face of an adjusting ring also secured to the base ring for rotary movement thereon. Rotation of the adjusting ring moves the engaging elements radially and calibrations on the face of the adjusting ring cooperate with an indicator hand on the base ring to indicate the diameter of a cylindrical object engaged by the engaging elements.

The primary object of the invention is to provide a direct reading variable ring gauge for measuring the diameter of shafts, pipe, tri-cones and rock bits.

Other objects and advantages will become apparent in the following specification when considered in light of the attached drawings.

DESCRIPTION OF THE PREFERRED EMBODIMENT

Figure 1:
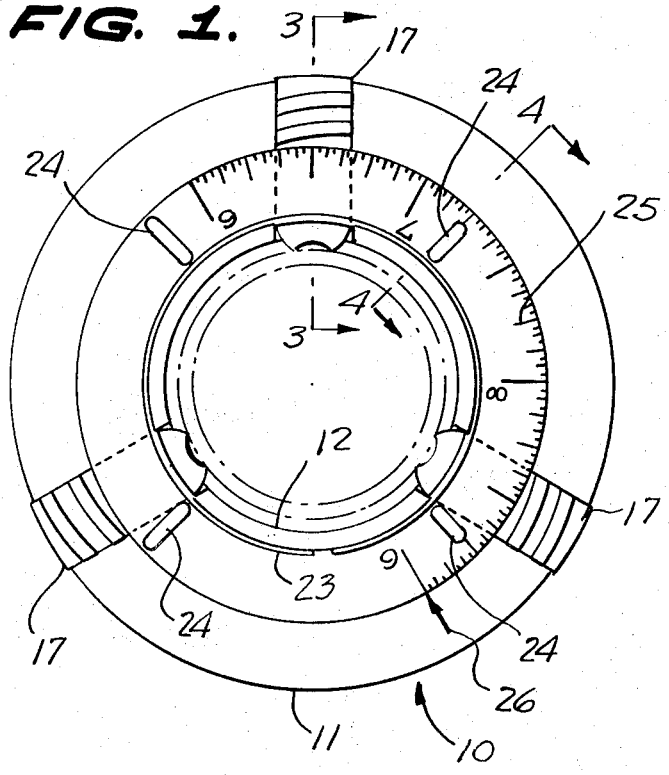
FIG. 1 is a top plan view of the invention.
Figure 2:
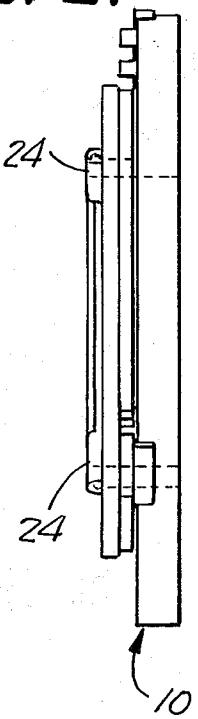
FIG. 2 is a side elevation of the invention.
Figure 3:
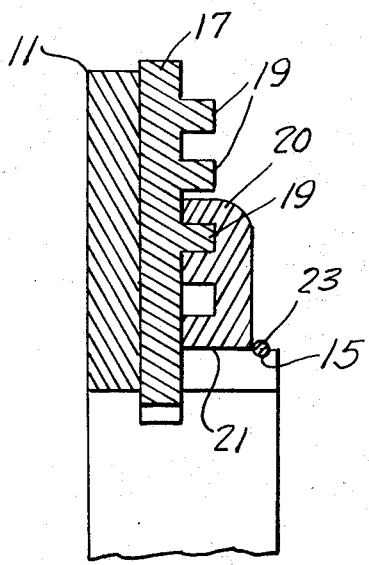
FIG. 3 is an enlarged fragmentary vertical sectional view taken along the line 3—3 of FIG. 1, looking in the direction of the arrows.
Figure 4:
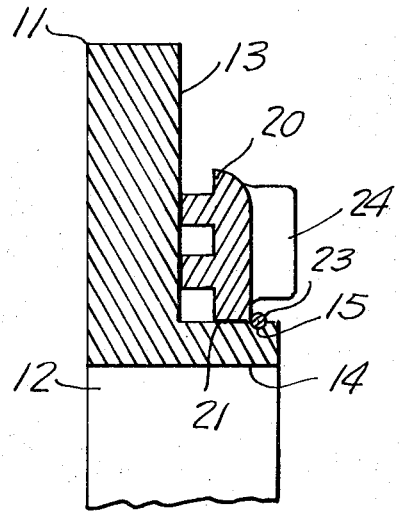
FIG. 4 is an enlarged fragmentary vertical sectional view taken along the line 4—4 of FIG. 1, looking in the direction of the arrows.
Figure 5:
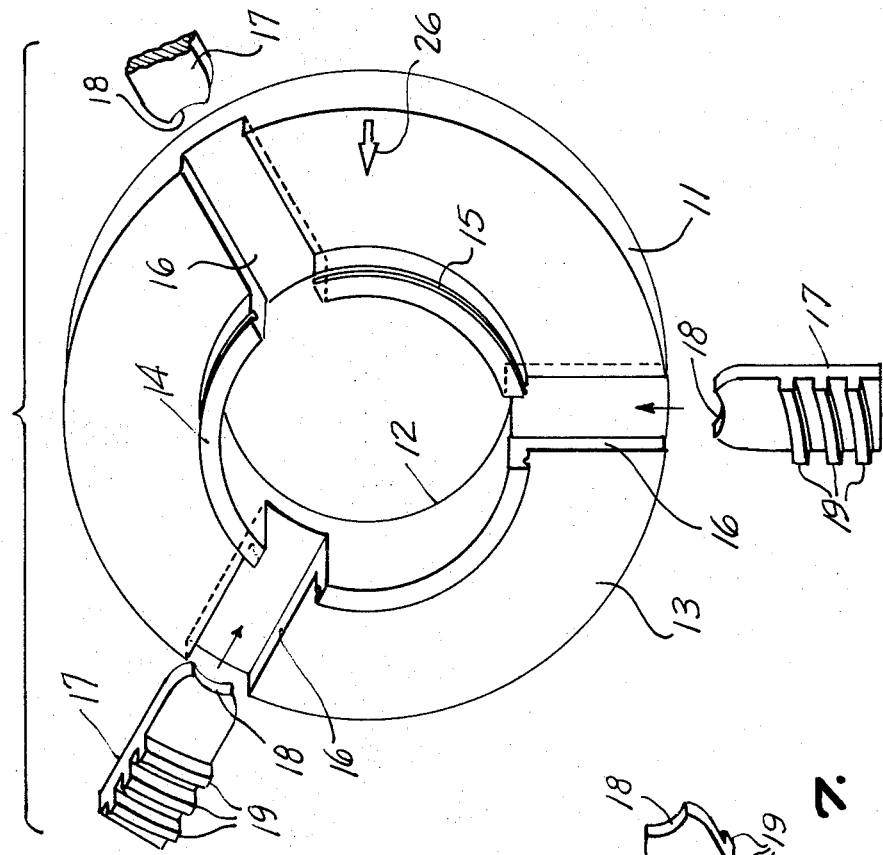
FIG. 5 is an exploded perspective view of the device with the adjusting ring removed.
Figure 7:
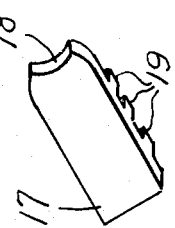
FIG. 7 is a perspective view of one of the engaging elements.
Figure 6:
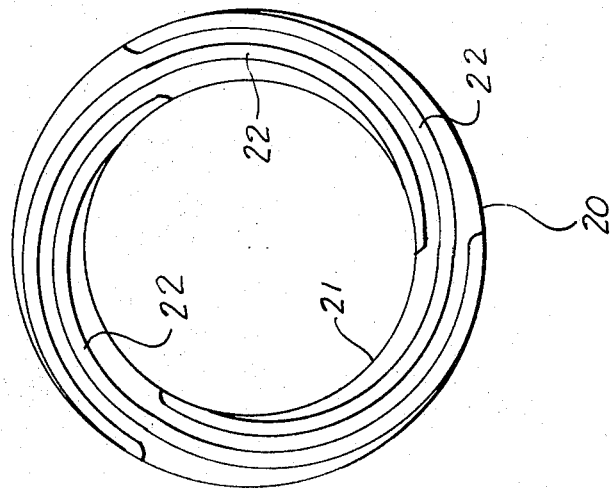
FIG. 6 is a plan view of the inner face of the adjusting ring.

Referring now to the drawings in detail, wherein like reference characters indicate like parts throughout the several figures, the reference numeral 10 indicates generally a variable ring gauge constructed in accordance with the invention.

The ring gauge 10 includes a base ring 11 having an axial bore 12 opening therethrough. The base ring 11 has a flat face 13 on one side thereof and an upstanding cylindrical neck 14 projects outwardly from the flat surface 13 concentric to the bore 12. The neck 14 has a retaining ring groove 15 formed in the outer face thereof for reasons to be assigned.

Three generally rectangular radial slots 16 extend across the flat surface 13 of the base ring 11 and open through the neck 14 at their inner ends communicating with the bore 12.

A generally rectangular engaging element 17 is radially slidably mounted in each of the grooves 16 and has an arcuate engaging face 18 formed on its inner end. A plurality of arcuate spaced apart thread segments 19 are integrally formed on the face of the engaging element 17 opposite the base ring 11 for reasons to be assigned.

A generally flat adjusting ring 20 has an axial bore 21 formed therein to engage around the circumference of the neck 14. The ring 20 turns freely on the neck 14 with the gauge 10 assembled.

The adjusting ring 20 has a plurality of arcuate thread segments 22 integrally formed on the inner face thereof to interfit with the thread segments 19 on the engaging elements 17. With the engaging elements 17 positioned on their respective slots 16, the ring 20 is engaged thereagainst around the neck 14 and a retainer ring 23 is engaged in the groove 15 to secure the adjusting ring 20 to the neck 14.

Upstanding lugs 24 are formed on the outer face of the adjusting ring 20 for engagement by the fingers of the operator when adjusting the ring 20 with respect to the base ring 11.

Scale markings 25 are formed on the outer face of the adjusting ring 20 to cooperate with an indicator hand 26 formed on the flat face 13 of the base ring 11.

In the use and operation of the invention, the base ring 11 is positioned over a shaft (not shown) with the shaft extending through the axial bore 12. The adjusting ring 20 is then rotated to bring all of the engaging elements 17 into contact with the shaft. With all of the engaging elements in contact with the shaft, the diameter of the shaft may be read directly by observing the indicator hand 26 and the scale 25. Rotation of the adjusting ring 20 causes the thread segments 22 to move the thread segments 19 of the engaging elements 17 and thus move the engaging elements 17 radially with respect to the bore 12.

While I have disclosed my invention as giving direct diameter readings, it should be understood that the scale could be calibrated to give direct radius or circumference readings should this be desired.

Having thus described the preferred embodiment of the invention, it should be understood that numerous structural modifications and adaptations may be restored to without departing from the spirit of the invention.

What is claimed is:

1. A variable ring gauge comprising a base ring, a cylindrical neck integrally secured to said base ring in axial alignment therewith, an axial bore extending through said base ring and said neck, three equispaced radially extending generally rectangular slots formed in one face of said base ring and extending through said neck communicating with said axial bore, a plurality of radially slidable engaging elements mounted in said slots on said base ring, an adjusting ring journalled on said neck on said base ring, thread means on said adjusting ring cooperating with thread means on said engaging elements for radially moving said engaging elements upon rotation of said adjusting ring with respect to said base ring, means on said adjusting ring cooperating with means on said base ring for indicating the diameter of an object engaged by said engaging elements, an annular groove in said neck, and a resilient retainer ring seated in said annular groove for retaining said adjusting ring on said neck.

2. A device as claimed in claim 1, wherein said adjusting ring secures said engaging elements in said slots.

\* \* \* \* \*